United States Patent
Oh et al.

(10) Patent No.: US 11,577,493 B2
(45) Date of Patent: Feb. 14, 2023

(54) METHOD OF MANUFACTURING CURVED THIN GLASS SHEET HAVING FUNCTIONAL LAYER AND METHOD OF MANUFACTURING CURVED JOINED GLASS SHEET HAVING FUNCTIONAL LAYER

(71) Applicant: LG CHEM, LTD., Seoul (KR)

(72) Inventors: Jun Hak Oh, Daejeon (KR); Ho Seong Kang, Daejeon (KR); Jae Hyuk Yoon, Daejeon (KR); Chang Hee Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 247 days.

(21) Appl. No.: 16/959,327

(22) PCT Filed: May 21, 2019

(86) PCT No.: PCT/KR2019/006041
§ 371 (c)(1),
(2) Date: Jun. 30, 2020

(87) PCT Pub. No.: WO2019/225936
PCT Pub. Date: Nov. 28, 2019

(65) Prior Publication Data
US 2021/0053859 A1    Feb. 25, 2021

(30) Foreign Application Priority Data

May 24, 2018 (KR) .................. 10-2018-0058851

(51) Int. Cl.
| C03B 23/035 | (2006.01) |
| C03C 17/245 | (2006.01) |
| B32B 1/00 | (2006.01) |

(Continued)

(52) U.S. Cl.
CPC .......... *B32B 17/10119* (2013.01); *B32B 1/00* (2013.01); *B32B 17/10* (2013.01); *B32B 17/10018* (2013.01); *B32B 17/1099* (2013.01); *B32B 17/10761* (2013.01); *B32B 37/12* (2013.01); *B32B 37/182* (2013.01); *B32B 38/0036* (2013.01); *C03B 23/0357* (2013.01);
(Continued)

(58) Field of Classification Search
CPC .................. C03B 23/0357; B32B 1/00; B32B 17/10761; B32B 17/1099; B32B 37/12; B32B 37/182; B32B 38/0036; B32B 17/10018; C03C 27/10; C03C 17/2453
USPC ........................................................ 156/221
See application file for complete search history.

(56) References Cited

U.S. PATENT DOCUMENTS

2015/0158276 A1   6/2015  Thompson et al.
2017/0008377 A1*  1/2017  Fisher ............... B32B 17/10889

FOREIGN PATENT DOCUMENTS

| CN | 103635315 A | 3/2014 |
| JP | 2015-533113 A | 11/2015 |

(Continued)

OTHER PUBLICATIONS

Machine translation of JP 2015/205784 A, Cover Glass with Adhesive Layer; Nov. 19, 2015; EPO; whole document (Year: 2015).*

*Primary Examiner* — Tahseen Khan
(74) *Attorney, Agent, or Firm* — Dentons US LLP

(57) ABSTRACT

The present invention relates to a method capable of easily manufacturing a curved thin glass sheet and a curved joined glass sheet to which functionality is added.

10 Claims, 2 Drawing Sheets

(51) Int. Cl.
  *B32B 17/10* (2006.01)
  *B32B 37/12* (2006.01)
  *B32B 37/18* (2006.01)
  *B32B 38/00* (2006.01)
  *C03C 27/10* (2006.01)
  *C03C 21/00* (2006.01)

(52) U.S. Cl.
  CPC .......... *C03C 17/2453* (2013.01); *C03C 27/10* (2013.01); *B32B 17/10137* (2013.01); *B32B 2255/20* (2013.01); *B32B 2307/202* (2013.01); *B32B 2309/02* (2013.01); *B32B 2309/105* (2013.01); *B32B 2315/08* (2013.01); *B32B 2329/06* (2013.01); *C03C 21/002* (2013.01); *C03C 2217/211* (2013.01); *C03C 2217/241* (2013.01); *C03C 2217/94* (2013.01); *C03C 2218/152* (2013.01)

(56) References Cited

FOREIGN PATENT DOCUMENTS

| | | | |
|---|---|---|---|
| JP | 2015205784 A | * 11/2015 | |
| JP | 2017-24386 A | 2/2017 | |
| JP | 2017-187685 A | 10/2017 | |
| JP | 2017-190271 A | 10/2017 | |
| KR | 10-1449363 B1 | 10/2014 | |
| KR | 10-2014-0140741 A | 12/2014 | |
| KR | 10-1593965 B1 | 2/2016 | |
| KR | 10-1605410 B1 | 3/2016 | |
| KR | 10-2016-0095143 A | 8/2016 | |
| WO | 2013/115068 A1 | 8/2013 | |
| WO | WO-2016196531 A1 | * 12/2016 | ....... B32B 17/10036 |
| WO | 2017/179382 A1 | 10/2017 | |

* cited by examiner

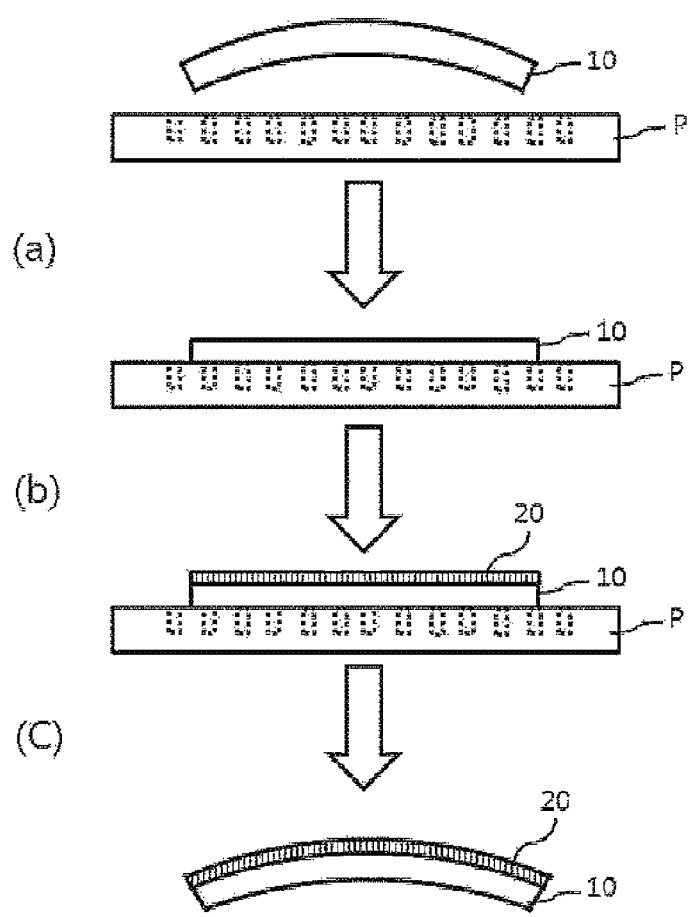

[Figure 2]
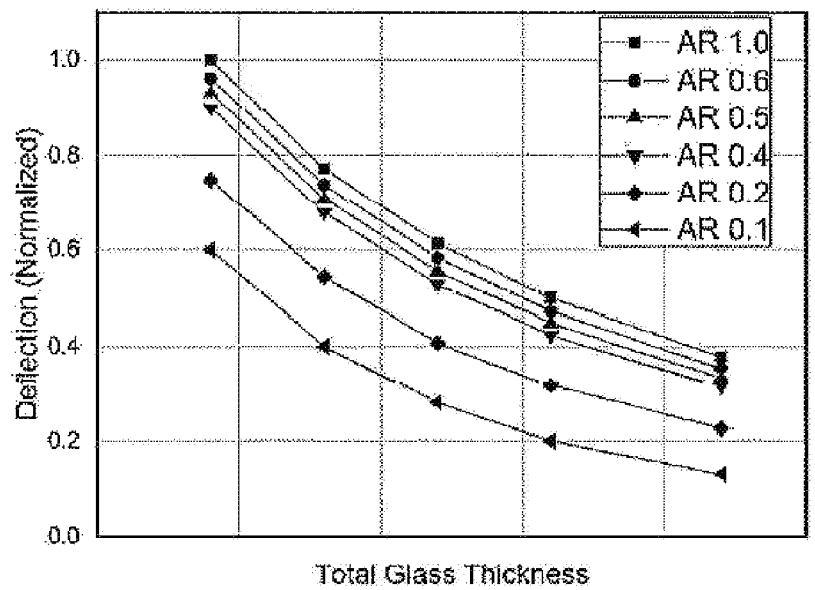
[Figure 3]
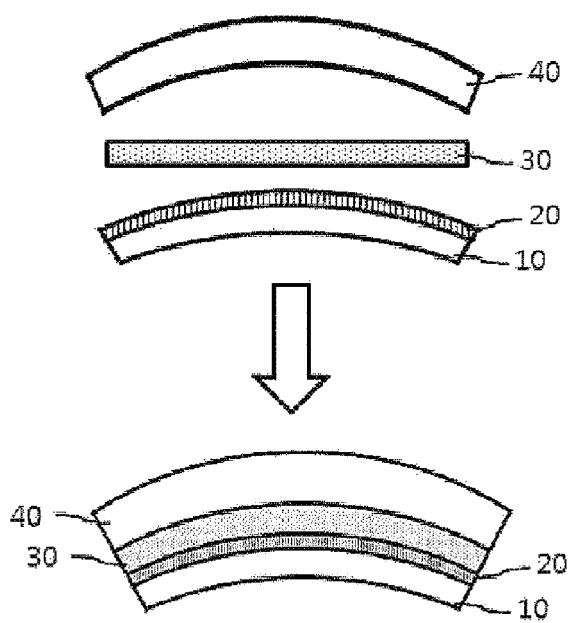

METHOD OF MANUFACTURING CURVED THIN GLASS SHEET HAVING FUNCTIONAL LAYER AND METHOD OF MANUFACTURING CURVED JOINED GLASS SHEET HAVING FUNCTIONAL LAYER

The present application is a National Phase entry pursuant to 35 U.S.C. § 371 of International Application No. PCT/KR2019/006041 filed May 21, 2019, and claims priority to and the benefit of Korean Patent Application No. 10-2018-0058851 filed with the Korean Intellectual Property Office on May 24, 2018, the entire contents of which are incorporated herein by reference.

FIELD

The present invention relates to a method capable of easily manufacturing a curved thin glass sheet and a curved joined glass sheet, to which functionality is added.

BACKGROUND

Glass is a material that has been applied to various living spaces because of its unique transparency. In particular, a joined glass sheet made by joining two glass sheets is used. A curved joined glass sheet, which is curved to have a curved surface, is used depending on the intended use. In addition, the curved joined glass sheet is manufacturing by using a thick glass sheet and a thin glass sheet to reduce volume and weight of the curved joined glass sheet.

In general, self-weight molding, compression molding, or cold molding is used to manufacture the curved joined glass sheet. The self-weight molding is a method that uses a molding frame for fixing a rim of a glass sheet, and increases a temperature of the glass sheet to be molded to a temperature in the vicinity of a softening point of glass, molds the glass sheet by using sag of the glass sheet caused by its own weight, and then joins the molded glass sheets. In addition, compression molding is a method that molds a glass sheet by compressing the glass sheet with a frame having a predetermined shape in a state in which the glass sheet is sufficiently heated, and then joins the molded glass sheets. In addition, cold molding is a method wherein one glass sheet is disposed on a concave surface of the other curvedly molded glass sheet, and the one glass sheet is elastically and curvedly deformed by using a vacuum technology, such that the glass sheets are joined.

Recently, curved joined glass sheets having functionality are being used in various fields such as buildings and vehicles to maximize environmental friendliness and energy efficiency. However, it is not easy to form a transparent heat generating layer or a transparent display on a curvedly molded glass sheet in order to add functionality to the curved joined glass sheet. The reason is that it is not easy to perform a process of forming a thin functional layer on a curvedly molded glass sheet, and it is not easy to form a functional layer having a uniform thickness on the curvedly molded glass sheet.

Therefore, there is a need for a technology capable of easily manufacturing a curved joined glass sheet having functionality.

SUMMARY

The present invention has been made in an effort to provide a method capable of easily manufacturing a curved thin glass sheet having functionality, and a method capable of easily manufacturing a curved joined glass sheet having functionality by using the same.

However, technical problems to be solved by the present invention are not limited to the above-mentioned technical problems, and other technical problems, which are not mentioned above, may be clearly understood by those skilled in the art from the following descriptions.

An exemplary embodiment of the present invention provides a method of manufacturing a curved thin glass sheet having a functional layer, the method including: preparing a curved thin glass sheet; elastically deforming the curved thin glass sheet into a plate-shaped thin glass sheet by applying an external force to the curved thin glass sheet; providing a functional layer on one surface of the plate-shaped thin glass sheet with the external force maintained; and deforming the plate-shaped thin glass sheet into a curved thin glass sheet by removing the external force.

A further exemplary embodiment of the present invention provides a curved thin glass sheet having a functional layer, manufactured by the method of manufacturing a curved thin glass sheet.

Another exemplary embodiment of the present invention provides a method of manufacturing a curved joined glass sheet having a functional layer, the method including: manufacturing a curved thin glass sheet having a functional layer by the method of manufacturing a curved thin glass sheet; providing a joining film or a bonding agent between the functional layer and a concave surface of a curved thick glass sheet whose thickness is larger than that of the curved thin glass sheet; and manufacturing a curved joined glass sheet by aligning and joining the curved thin glass sheet having the functional layer with the curved thick glass sheet.

An exemplary embodiment of the present invention provides a curved joined glass sheet having a functional layer, manufactured by the method of manufacturing a curved joined glass sheet.

The method of manufacturing a thin glass sheet having a functional layer according to the exemplary embodiment of the present invention may easily manufacture a curved thin glass sheet having functionality.

According to an exemplary embodiment of the present invention, it is possible to provide the curved thin glass sheet having a functional layer with a uniform thickness and excellent quality.

According to another exemplary embodiment of the present invention, it is possible to easily manufacture a curved joined glass sheet having functionality.

The effects of the present invention are not limited to the above-mentioned effects, and other effects, which are not mentioned above, may be clearly understood by those skilled in the art from the present specification and the accompanying drawings.

BRIEF DESCRIPTION OF THE DRAWINGS

FIGS. 1(a)-1(c) illustrate a process of manufacturing a curved thin glass sheet having a functional layer according to an exemplary embodiment of the present invention.

FIG. 2 illustrates a result of ensuring rigidity in accordance with a thickness ratio between a curved thick glass sheet and a curved thin glass sheet according to the exemplary embodiment of the present invention.

FIG. 3 is an illustration of a method of manufacturing a curved joined glass sheet having a functional layer according to the exemplary embodiment of the present invention.

DETAILED DESCRIPTION

Throughout the specification of the present application, unless explicitly described to the contrary, the word "comprise/include" and variations such as "comprises/includes" or "comprising/including" will be understood to imply the further inclusion of stated elements, not the exclusion of any other elements.

Throughout the specification of the present application, when one member is disposed "on" another member, this includes not only a case where the one member is brought into contact with another member, but also a case where still another member is present between the two members.

Throughout the specification of the present application, the unit "wt %" means a ratio of a weight of a substance contained in a member to a total weight of the member.

Throughout the specification of the present application, a "radius of curvature" of a glass sheet may mean a minimum value of a radius of an arc most proximate to a curved surface in all directions at fine points on a surface of a curvedly molded glass sheet. In addition, the radius of curvature may be measured by scanning and modeling the surface of the curvedly molded glass sheet by using a 3D scanner (Faro/Focus S) or the like. As such, it is possible to measure a radius of curvature of a glass sheet having a single curved surface or measure radii of curvature of a glass sheet having multiple curved surfaces.

The present inventors have ascertained that when forming a functional layer on a surface of a curvedly molded glass sheet to manufacture a curved glass sheet having functionality, it is difficult to form the functional layer having a uniform thickness on the surface of the curvedly molded glass sheet. In addition, the present inventors have ascertained that when forming a functional layer on a flat-plate-shaped glass sheet and then molding the glass sheet curvedly by a method such as self-weight molding or the like, the functional layer formed on the surface of the glass sheet is damaged. Therefore, the present inventors have found that it is possible to manufacture a curved glass sheet having functionality through a simple method of elastically deforming a curvedly molded glass sheet in the form of a plate by applying external force thereto, forming a functional layer on a surface of the glass sheet, and then removing the external force, and the present inventors have developed a method of manufacturing a curved thin glass sheet having a functional layer and a method of manufacturing a curved joined glass sheet having a functional layer which will be described below.

Hereinafter, the present specification will be described in more detail.

An exemplary embodiment of the present invention provides a method of manufacturing a curved thin glass sheet having a functional layer, the method including: preparing a curved thin glass sheet; elastically deforming the curved thin glass sheet into a plate-shaped thin glass sheet by applying external force to the curved thin glass sheet; providing a functional layer on one surface of the plate-shaped thin glass sheet with the external force maintained; and deforming the plate-shaped thin glass sheet into a curved thin glass sheet by removing the external force.

The method of manufacturing a thin glass sheet having a functional layer according to the exemplary embodiment of the present invention may easily manufacture a curved thin glass sheet having functionality. Specifically, it is possible to easily manufacture a curved thin glass sheet having a functional layer through a simple method of elastically deforming the curved thin glass sheet into a plate-shaped thin glass sheet by applying external force to the curved thin glass sheet, forming a functional layer on a surface of the thin glass sheet with the external force maintained, and then removing the external force.

According to an exemplary embodiment of the present invention, the preparing of the curved thin glass sheet may manufacture the curved thin glass sheet by using a publicly known method of forming a curved glass sheet in the art. As an example, it is possible to manufacture the curved thin glass sheet from a flat-plate-shaped thin glass sheet by using self-weight molding or compression molding.

According to a further exemplary embodiment of the present invention, a glass sheet, which is typically used for a glass window for a vehicle, may be adopted and used for the thin glass sheet without a particular limitation. Specifically, the thin glass sheet may be made of alkali-free glass.

As an example, the thin glass sheet may be made of alkali-free glass that is formed from a composition containing $SiO_2$ of 46 wt. % or more and 62 wt. % or less, $Al_2O_3$ of 15 wt. % or more and 29 wt. % or less, MgO of 3 wt. % or more and 14 wt. % or less, CaO of 5 wt. % or more and 16 wt. % or less, and SrO of 0.01 wt. % or more and 5 wt. % or less, based on the composition of 100 wt. %, and containing substantially no alkaline metal oxide.

Containing substantially no alkaline metal oxide may mean that the alkaline metal oxide is not contained in the glass at all, or even if the alkaline metal oxide is partially contained in the glass, the content of the alkaline metal oxide is extremely small as compared with contents of other components, such that the content of the alkaline metal oxide is negligible. For example, containing substantially no alkaline metal oxide may mean that a small amount of alkaline metal elements is inevitably contained in the glass from refractory materials in contact with molten glass or from impurities in a glass raw material in a process of manufacturing glass.

According to an exemplary embodiment of the present invention, the alkali-free glass, which may be used for the thin glass sheet, may contain alkaline metal (Li, Na, K, etc.) oxide of less than 1% as a percentage by mass in terms of oxide. In addition, alkali-free borosilicate glass or alkali-free alumino-borosilicate glass may be used for the thin glass sheet. In addition, glass manufactured by a floating method or glass manufactured by a down drawing or fusion method may be used for the thin glass sheet.

According to another exemplary embodiment of the present invention, tempered glass or non-tempered glass may be used for the thin glass sheet. As an example, chemically tempered glass, thermally tempered glass, or thermally and chemically tempered glass may be used as the thin glass sheet.

According to a further exemplary embodiment of the present invention, the curved thin glass sheet may have a single curved surface or multiple curved surfaces. Specifically, the curved thin glass sheet may be a curved glass sheet which is formed based on a single axis and has a single curved surface having a curvature only in a single direction. In addition, the curved thin glass sheet may be a curved glass sheet which is formed based on two axes and has multiple curved surfaces having curvatures in multiple directions. As an example, the glass sheet may have the multiple curved surfaces which are spherical surfaces, parabolic surfaces, or freely-curved surfaces.

According to an exemplary embodiment of the present invention, the curved thin glass sheet may have a radius of curvature of 500 mm or more and 8,000 mm or less. Specifically, the radius of curvature of the curved thin glass sheet may be 1,200 mm or more and 8,000 mm or less, 700 mm or more and 7,000 mm or less, 1,000 mm or more and 5,500 mm or less, 1,200 mm or more and 4,500 mm or less, 1,500 mm or more and 3,000 mm or less, 750 mm or more and 1,500 mm or less, 1,700 mm or more and 3,500 mm or less, or 4,000 mm or more and 7,500 mm or less.

In addition, the curved thin glass sheet may be a thin glass sheet which has multiple curved surfaces and a radius of curvature of 500 mm or more and 8,000 mm or less. The radius of curvature of the thin glass sheet having the multiple curved surfaces may be a minimum value of the radii of curvature measured at multiple points spaced apart at an equal distance from a center of the thin glass sheet having the multiple curved surfaces.

According to an exemplary embodiment of the present invention, when the radius of curvature of the curved thin glass sheet is within the above-mentioned range, it is possible to prevent damage to the thin glass sheet during the process of elastically deforming the curved thin glass sheet into the plate-shaped thin glass sheet by applying external force to the curved thin glass sheet.

FIGS. 1(a)-1(c) illustrate a process of manufacturing a curved thin glass sheet having a functional layer according to an exemplary embodiment of the present invention. Specifically, FIG. 1(a) illustrates a process of positioning a concave surface of a curved thin glass sheet 10 adjacent to a vacuum plate P, and elastically deforming the curved thin glass sheet 10 into the plate-shaped thin glass sheet 10 by operating the vacuum plate P. In addition, FIG. 1(b) illustrates a process of forming a functional layer 20 on the elastically deformed plate-shaped thin glass sheet 10. In addition, FIG. 1(c) is a view illustrating a state in which the operation of the vacuum plate P is stopped, and the plate-shaped thin glass sheet 10 having the functional layer 20 returns to the curved thin glass sheet 10.

According to an exemplary embodiment of the present invention, it is possible to elastically deform the curved thin glass sheet in the form of a plate by applying external force to the curved thin glass sheet. A method capable of elastically deforming a curved thin glass sheet in the art may be used, without limitation, as the method of applying external force to the curved thin glass sheet. For example, a convex surface of the curved thin glass sheet may be pressed, gas may be discharged toward the convex surface of the curved thin glass sheet, or the concave surface of the curved thin glass sheet may be sucked in a vacuum. However, the method of applying external force to the curved thin glass sheet is not limited thereto.

According to another exemplary embodiment of the present invention, the elastically deforming of the curved thin glass sheet into the plate-shaped thin glass sheet may maintain the curved thin glass sheet in the form of a plate by sucking, in a vacuum, the concave surface of the curved thin glass sheet or by using adhesive force. Specifically, external force may be applied to the curved thin glass sheet as the concave surface of the curved thin glass sheet is sucked in a vacuum, and thus the curved thin glass sheet may be elastically deformed into the plate-shaped thin glass sheet. In addition, the curved thin glass sheet may be fixed in the form of a plate as the suction with the vacuum is maintained. A method used in the art may be used, without limitation, as the method of sucking, in a vacuum, the concave surface of the curved thin glass sheet. As an example, the concave surface of the curved thin glass sheet may be positioned so as to be adjacent to a plate-shaped vacuum plate, and the vacuum plate may be operated to elastically deform the curved thin glass sheet. Therefore, the plate-shaped thin glass sheet may be sucked onto the plate-shaped vacuum plate. Thereafter, a functional layer is formed on one surface of the plate-shaped thin glass sheet, and then the operation of the vacuum plate is stopped, such that the elastically deformed plate-shaped thin glass sheet may return to the curved shape.

According to a further exemplary embodiment of the present invention, it is possible to easily and elastically deform the curved thin glass sheet into the plate-shaped thin glass sheet by the simple method of sucking the curved thin glass sheet in a vacuum, and it is possible to easily form a functional layer on the plate-shaped thin glass sheet.

In addition, an adhesive agent or an adhesive film may be provided on the concave surface of the curved thin glass sheet, and then the curved thin glass sheet is pressed in a direction from the convex surface to the concave surface of the curved thin glass sheet, such that the curved thin glass sheet may be attached to a base. Therefore, it is possible to maintain the curved thin glass sheet in the form of a plate. An adhesive agent or an adhesive film, which may be easily removed from the concave surface of the curved thin glass sheet, may be used as the adhesive agent or the adhesive film. Specifically, the adhesive agent or the adhesive film, which may be easily removed from the thin glass sheet after the functional layer is provided on one surface of the plate-shaped thin glass sheet, may be used. More specifically, an appropriate adhesive agent or an appropriate adhesive film, which does not leave a mark on the thin glass sheet, may be selected and used.

According to an exemplary embodiment of the present invention, a thickness of the curved thin glass sheet may be 0.3 mm or more and 1.0 mm or less. That is, a thickness of a flat-plate-shaped thin glass sheet used to manufacture the curved thin glass sheet may be 0.3 mm or more and 1.0 mm or less. In addition, the thickness of the curved thin glass sheet may be 0.3 mm or more and 0.8 mm or less, 0.4 mm or more and 0.6 mm or less, 0.3 mm or more and 0.7 mm or less, or 0.5 mm or more and 0.8 mm or less. The curved thin glass sheet having a thickness within the above-mentioned range may be easily and elastically deformed into the plate-shaped thin glass sheet. In addition, by using the curved thin glass sheet having the thickness within the above-mentioned range, it is possible to implement the curved joined glass sheet which has excellent impact resistance and becomes effectively thinned and light in weight.

According to another exemplary embodiment of the present invention, a change in stress generated on the surface of the plate-shaped thin glass sheet because of the elastic deformation may be 1.5 GPa or less, 1.1 GPa or less, or 0.8 GPa or less. As the curved thin glass sheet is elastically deformed into the plate-shaped thin glass sheet, stress may be additionally applied to the surface of the plate-shaped thin glass sheet. In this case, an absolute value of a difference between a value of stress $\sigma_F$ present for each position on the surface of the thin glass sheet elastically deformed in the form of a flat plate and a value of stress $\sigma_C$ present on the surface of the thin glass sheet, before deformation, at a position corresponding to a position at which the stress $\sigma_F$ is measured may be 1.5 GPa or less, 1.1 GPa or less, or 0.8 GPa or less ($|\Delta\sigma|$<1.5 GPa, 1.1 GPa, or 0.8 GPa). Specifically, the change in stress $|\Delta\sigma|$ may be an average value of the changes in stress at the respective positions on the surface of the glass sheet. In addition, the change in stress, which is generated on the surface of the plate-shaped thin glass sheet because of the elastic deformation, may be 0.1 GPa or more and 1.5 GPa or less, 0.8 GPa or more and 1.5 GPa or less, or 0.8 GPa or more and 1.1 GPa or less.

When the amount of change in stress, which is generated on the surface of the thin glass sheet because of the elastic deformation, is within the above-mentioned range, it is possible to effectively prevent damage to the thin glass sheet during the process of elastically deforming the curved thin glass sheet into the plate-shaped thin glass sheet. In addition, by adjusting the radius of curvature of the curved thin glass sheet, it is possible to control the amount of change in stress which is generated on the plate-shaped thin glass sheet because of the elastic deformation.

According to an exemplary embodiment of the present invention, the term "stress" may mean stress including tensile stress and compressive stress. In addition, in the present invention, tensile stress, compressive stress, and the like present on the glass sheet may be calculated by a general method used in the art, and in the present invention, the stress may be calculated through an optical method using the Edge-master equipment (Stress Photonics, Inc.). Specifically, by using the Edge-master equipment, it is possible to acquire an image which illustrates colors distinguished in accordance with the stress present on the surface of the glass sheet, and it is possible to calculate a stress value by using the image. In addition, it is possible to calculate stress present on the surface of the glass sheet by using the Solidworks Simulation. For example, manufacturing processes and process conditions for the curved thin glass sheet having the functional layer according to the present invention may be set in the Solidworks Simulation, and then the stress may be calculated before and after the thin glass sheet is elastically deformed.

According to an exemplary embodiment of the present invention, tensile stress present on the surface of the elastically deformed plate-shaped thin glass sheet may be 800 MPa or less. Specifically, tensile stress present on the surface of the elastically deformed plate-shaped thin glass sheet may be 750 MPa or less, 600 MPa or less, 400 MPa or less, 355 MPa or less, 300 MPa or less, or 270 MPa or less.

According to another exemplary embodiment of the present invention, when the tensile stress present on the surface of the elastically deformed plate-shaped thin glass sheet is within the above-mentioned range, it is possible to effectively inhibit damage to the thin glass sheet during the process of elastically deforming the curved thin glass sheet into the plate-shaped thin glass sheet. In addition, by adjusting the radius of curvature of the curved thin glass sheet, it is possible to control the tensile stress present on the surface of the elastically deformed plate-shaped thin glass sheet.

Therefore, according to the exemplary embodiment of the present invention, as the amount of change in stress, which is generated on the surface of the plate-shaped thin glass sheet because of the elastic deformation, and/or the tensile stress present on the surface of the elastically deformed plate-shaped thin glass sheet is adjusted to the above-mentioned range, it is possible to provide the functional layer on the curved thin glass sheet without damage to the thin glass sheet.

According to an exemplary embodiment of the present invention, the functional layer may be provided on one surface of the plate-shaped thin glass sheet while maintaining the external force which elastically deforms the curved thin glass sheet into the plate-shaped thin glass sheet. The functional layer may be provided on the entire one surface or a part of the one surface of the plate-shaped thin glass sheet based on the intended use. In addition, the functional layer may be attached onto one surface of the plate-shaped thin glass sheet by using a joining film or an adhesive agent, or one surface of the plate-shaped thin glass sheet may be coated with the functional layer by applying a composition that may form the functional layer.

According to exemplary embodiments of the present invention, the functional layer may be a transparent heat generating layer, a transparent display unit, or a variable color layer. In a case in which the transparent heat generating layer is provided as the functional layer, it is possible to provide a functional curved thin glass sheet that may generate heat uniformly on the entire curved thin glass sheet. In addition, in a case in which the transparent display unit is provided as the functional layer, it is possible to manufacture a thin glass sheet for a curved display. In addition, in a case in which the variable color layer is provided as the functional layer, it is possible to provide a functional curved thin glass sheet of which the color or light transmittance may be changed as a voltage is applied.

According to an exemplary embodiment of the present invention, as the external force is removed after the functional layer is provided on one surface of the plate-shaped thin glass sheet, the plate-shaped thin glass sheet may return to the curved thin glass sheet which is the form before the plate-shaped thin glass sheet is elastically deformed. Since the curved thin glass sheet is made by elastically deforming the glass sheet with the external force, the glass sheet may be deformed into the curved thin glass sheet as the external force is removed. Therefore, it is possible to provide the curved thin glass sheet having one surface on which the functional layer having a uniform thickness is provided and damage to the functional layer is inhibited.

The exemplary embodiment of the present invention provides a curved thin glass sheet having a functional layer which is manufactured according to the method of manufacturing a curved thin glass sheet.

According to the exemplary embodiment of the present invention, it is possible to provide the curved thin glass sheet having a functional layer with a uniform thickness and excellent quality.

According to an exemplary embodiment of the present invention, a transparent heat generating layer is provided on one surface of the curved thin glass sheet, and thus it is possible to provide the functional curved thin glass sheet that may generate heat uniformly on the entire curved thin glass sheet. A publicly known configuration may be used as the transparent heat generating layer, and the type of transparent heat generating layer is not limited as long as an object positioned behind the transparent heat generating layer is visible and the transparent heat generating layer may be configured to generate heat. As electricity is supplied to the transparent heat generating layer, it is possible to uniformly provide heat to the entire curved joined glass sheet.

The transparent heat generating layer may include a transparent electrode made of at least one of gold (Au), silver (Ag), aluminum (Al), copper (Cu), chromium (Cr), nickel (Ni), titanium (Ti), palladium (Pd), molybdenum (Mo), copper oxide ($Cu_2O$, CuO), aluminum oxide ($Al_2O_3$), silver oxide (AgO), chromium oxide (CrOx), titanium oxide ($TiO_2$), palladium oxide (PdO), molybdenum oxide ($MoO_3$), indium-tin oxide (ITO), and fluorine-doped tin oxide (FTO). In addition, the transparent electrode may be a metal-mesh electrode having a fine conductive line.

According to another exemplary embodiment of the present invention, a transparent display unit is provided on one surface of the curved thin glass sheet, and thus it is possible to provide a glass sheet for a curved display. A publicly known configuration may be used as the transparent display unit, and the type of transparent display unit is not limited as long as an object positioned behind the transparent display unit is visible and the transparent display unit may be configured to output information.

The transparent display unit may include a transparent display panel and a control module that controls the transparent display panel. The transparent display panel may include one of a liquid crystal display (LCD), a thin film transistor-liquid crystal display (TFT LCD), an organic light emitting diode (OLED), a flexible display, and a three-dimensional display (3D display), and the transparent display panel may be of a transparent type or a light transmissive type so that a place rearward from the transparent display panel is visible through the transparent display panel.

In addition, in a case in which the transparent display panel and a touch sensor constitute a layered structure, or are formed integrally, the transparent display panel may be used as an input device as well as an output device. In the case in which the curved thin glass sheet is made of alkali-free glass, the curved thin glass sheet may be used as a substrate glass sheet because the alkali-free glass contains no alkali or contains an extremely small amount of alkali. That is, a touch film, a touch sheet, a touch pad, or the like may be formed on the curved thin glass sheet.

According to a further exemplary embodiment of the present invention, a variable color layer is provided on one surface of the curved thin glass sheet, and thus it is possible to provide a functional curved thin glass sheet of which the glass color or the light transmittance may be changed as a voltage is applied.

A publicly known configuration may be used as the variable color layer, and the type of variable color layer is not limited as long as the color or light transmittance of a glass sheet may be changed by electrical stimulation. As an example, the variable color layer may include conductive layers to which a power source is connected, an electrolyte layer disposed between the conductive layers, and an ion charge layer disposed at one side of the electrolyte layer. When an electric current is supplied to the conductive layers, the color of the variable color layer may be changed by electrons discharged from the ion charge layer connected to the conductive layers.

Another exemplary embodiment of the present invention provides a method of manufacturing a curved joined glass sheet having a functional layer, the method including: manufacturing a curved thin glass sheet having a functional layer by the method of manufacturing a curved thin glass sheet; providing a joining film or a bonding agent between the functional layer and a concave surface of a curved thick glass sheet whose thickness is greater than that of the curved thin glass sheet; and manufacturing a curved joined glass sheet by aligning and joining the curved thin glass sheet having the functional layer with the curved thick glass sheet.

The method of manufacturing a curved joined glass sheet having a functional layer according to the exemplary embodiment of the present invention may easily manufacture a curved joined glass sheet having functionality.

FIG. 3 is a view illustrating a method of manufacturing a curved joined glass sheet having a functional layer according to the exemplary embodiment of the present invention. Specifically, FIG. 3 is a view illustrating a state in which a joining film 30 is positioned between a curved thick glass sheet 40 and a functional layer 20 of a curved thin glass sheet 10 manufactured by the method of manufacturing a curved thin glass sheet having a functional layer, and the curved thin glass sheet 10 having the functional layer 20 is joined to the curved thick glass sheet 40.

According to the exemplary embodiment of the present invention, the curved thick glass sheet may be manufactured by using a publicly known method of forming a curved glass sheet in the art. As an example, the curved thick glass sheet may be manufactured from a plate-shaped thick glass sheet by using self-weight molding or compression molding.

According to an exemplary embodiment of the present invention, soda lime glass may be used for the thick glass sheet. Specifically, a glass sheet, which is typically used for a glass window for a vehicle, may be adopted to and used for the thick glass sheet without a particular limitation. As an example, the thick glass sheet may be made of soda lime glass that is formed from a composition containing $SiO_2$ of 65 wt. % or more and 75 wt. % or less, $Al_2O_3$ of 0 wt. % or more and 10 wt. % or less, $NaO_2$ of 10 wt. % or more and 15 wt. % or less, $K_2O$ of 0 wt. % or more and 5 wt. % or less, CaO of 1 wt. % or more and 12 wt. % or less, and MgO of 0 wt. % or more and 8 wt. % or less, based on the composition of 100 wt. %. In addition, soda lime glass manufactured by a floating method using a float bath or soda lime glass manufactured by a down drawing method or a fusion method may be used for the thick glass sheet.

According to an exemplary embodiment of the present invention, the curved thick glass sheet may have a single curved surface or multiple curved surfaces. In addition, the curved thick glass sheet may have a radius of curvature of 500 mm or more and 8,000 mm or less, and the curved thick glass sheet may have the multiple curved surfaces and a radius of curvature of 500 mm or more and 8,000 mm or less.

According to an exemplary embodiment of the present invention, a joining film or a bonding agent may be provided between the functional layer and a concave surface of the curved thick glass sheet. Specifically, the joining film or the bonding agent may be positioned on the functional layer provided on one surface of the curved thin glass sheet, or the joining film or the bonding agent may be positioned on the concave surface of the curved thick glass sheet. Therefore, the curved thin glass sheet having the functional layer may be joined to the curved thick glass sheet.

According to the exemplary embodiment of the present invention, the joining film may have a single layer or multiple layers. Specifically, in a case in which a multilayer joining film is used, compositions of the respective layers may be identical or different, and thicknesses of the respective layers may be equal or different. A (co)polymer film, such as a polyvinyl alcohol-polyvinyl butyral copolymer film, or the like, which is used to join a joined glass sheet in the art, may be adopted to and used for the joining film without a particular limitation. As an example, the joining film may include at least one of polyethylene, ethylene acetic vinyl copolymer, polypropylene, polystyrene, methacrylic resin, polyvinyl chloride, polyethylene terephthalate, polybutylene terephthalate, cellulose acetate, diallyl phthalate resin, urea resin, melamine resin, unsaturated polyester, polyvinyl butyral, polyvinyl formal, polyvinyl alcohol, acetic vinyl resin, ionomer, polymethyl pentene, vinylidene chloride, polysulphone, polyvinylidene fluoride, methacrylic-styrene co-polymer resin, polyarylate, polyallyl sulphone, polybutadiene, polyether sulphone, and polyether ether ketone.

According to an exemplary embodiment of the present invention, a thickness of the joining film may be, but not limited to, 0.5 mm or more and 1 mm or less. However, by adjusting the thickness of the joining film to the above-mentioned range, it is possible to prevent the functional layer and the curved thick glass sheet from being separated from each other because bonding force between the functional layer and the curved thick glass sheet is not sufficient. In addition, by adjusting the thickness of the joining film to the above-mentioned range, it is possible to manufacture the curved joined glass sheet which is small in thickness.

According to exemplary embodiments of the present invention, the bonding agent may include optically clear adhesive (OCA), liquid optically clear adhesive (LOCA), or optically clear resin (OCR). The bonding agent may be applied, with a thickness of 0.5 mm or more and 1.5 mm or less, onto the functional layer or the concave surface of the curved thick glass sheet.

According to an exemplary embodiment of the present invention, the curved thin glass sheet having the functional layer may be matched with and joined to the curved thick glass sheet by a method typically used in the art. For example, in a case in which the curved thin glass sheet having the functional layer and the curved thick glass sheet have substantially the same radius of curvature, the joining film or the bonding agent may be provided between the functional layer and the concave surface of the curved thick glass sheet, and the curved thick glass sheet and the curved thin glass sheet may be pressed and joined. In addition, in a case in which the curved thin glass sheet having the functional layer and the curved thick glass sheet have different radii of curvature, the curved thin glass sheet having the functional layer may be elastically deformed, and then the curved thin glass sheet and the curved thick glass sheet may be joined together.

According to an exemplary embodiment of the present invention, a method of elastically deforming the curved thin glass sheet having the functional layer is not particularly limited as long as the method is typically used in the art. As an example, the curved thin glass sheet having the functional layer may be elastically deformed through a compression process using a high-temperature roller or vacuum ring/vacuum bag process.

According to an exemplary embodiment of the present invention, the curved thin glass sheet having the functional layer may be elastically deformed at a temperature of 50° C. or less. Specifically, the curved thin glass sheet having the functional layer may be elastically deformed at a temperature of 0° C. or more and 15° C. or less, a temperature of 20° C. or more and 35° C. or less, or a temperature of 25° C. or more and 45° C. or less.

According to an exemplary embodiment of the present invention, the curved thin glass sheet having the functional layer may be matched with and joined to the concave surface of the curved thick glass sheet. Therefore, the curved thin glass sheet having the functional layer and the curved thick glass sheet, which are included in the curved joined glass sheet, may have substantially the same radius of curvature. The configuration in which the glass sheets have substantially the same radius of curvature may mean that the curvatures of the glass sheets are completely equal to each other, and may also mean that there is a delicate difference between the curvatures of the glass sheets during the manufacturing process, but the difference does not affect quality and optical and physical properties. Therefore, the manufactured curved joined glass sheet having the functional layer is excellent in optical quality and mechanical quality.

According to an exemplary embodiment of the present invention, the method may further include heat-treating the curved joined glass sheet at a temperature of 80° C. or more and 140° C. or less, or 80° C. or more and 130° C. or less. As the manufactured curved joined glass sheet is heat-treated within the above-mentioned temperature range, joining force between the functional layer and the curved thick glass sheet may be improved.

In addition, the method of manufacturing a curved joined glass sheet may perform the heat treatment twice or more. As an example, the curved joined glass sheet may be heat-treated at a temperature of about 90° C., and then heat-treated again at a temperature of about 120° C., such that the curved joined glass sheet may be finally manufactured.

According to an exemplary embodiment of the present invention, a thickness ratio between the curved thick glass sheet and the curved thin glass sheet may be 1:0.1 to 1:0.6. Specifically, a thickness ratio between the curved thick glass sheet and the curved thin glass sheet, except for the functional layer, may be 1:0.1 to 1:0.6. In addition, the thickness ratio between the curved thick glass sheet and the curved thin glass sheet may be 1:0.1 to 1:0.6, 1:0.15 to 1:0.45, 1:0.25 to 1:0.3, 1:0.15 to 1:0.25, or 1:0.3 to 1:0.45. As the thickness ratio between the curved thick glass sheet and the curved thin glass sheet is adjusted to the above-mentioned range, it is possible to effectively reduce a probability that the curved joined glass sheet is damaged due to a decrease in rigidity. In addition, it is possible to provide a curved joined glass sheet having a smaller thickness.

FIG. 2 illustrates a result of ensuring rigidity in accordance with the thickness ratio between the curved thick glass sheet and the curved thin glass sheet according to the exemplary embodiment of the present invention. Specifically, FIG. 2 illustrates deflection of a central portion analyzed by applying a predetermined load to the central portion in a state in which four edges of the curved joined glass sheet according to the exemplary embodiment of the present invention are fixed. In FIG. 2, the x axis indicates an overall thickness of the glass sheet, and the y axis indicates the deflection of the glass sheet, that is, a degree to which the glass sheet sags.

According to an exemplary embodiment of the present invention, an asymmetry ratio (AR), which is [a thickness of the curved thin glass sheet]/[a thickness of the curved thick glass sheet], may satisfy a range from 0.1 to 0.6. A decrease in AR means that the curved thin glass sheet becomes thinner and the curved thick glass sheet becomes thicker. Referring to FIG. 2, by adjusting the thickness ratio between the curved thin glass sheet and the curved thick glass sheet to the above-mentioned range, it is possible to ensure rigidity by decreasing a degree to which the curved joined glass sheet sags.

Therefore, according to the exemplary embodiment of the present invention, by adjusting the thickness ratio between the curved thin glass sheet and the curved thick glass sheet to the above-mentioned range, it is possible to further improve an effect of improving rigidity of the curved joined glass sheet, an effect of reducing a weight of the curved joined glass sheet, and an effect of reducing a thickness of the curved joined glass sheet.

According to an exemplary embodiment of the present invention, a thickness of the curved thick glass sheet may be 2 mm or more and 3 mm or less. Specifically, a thickness of the curved thick glass sheet may be 2.5 mm or more and 3 mm or less. By adjusting the thickness of the curved thick glass sheet to the above-mentioned range, it is possible to effectively reduce weight and thickness of the curved joined glass sheet and to inhibit deterioration in impact resistance of the curved joined glass sheet.

The exemplary embodiment of the present invention provides a curved joined glass sheet having a functional layer manufactured by the method of manufacturing a curved joined glass sheet.

According to an exemplary embodiment of the present invention, when the curved joined glass sheet manufactured by using the curved thin glass sheet including the transparent heat generating layer is applied to a window for a vehicle, it is possible to prevent dew formation that may occur on the window for a vehicle due to a difference in temperature between the inside and the outside of the vehicle, and it is possible to remove frost.

According to an exemplary embodiment of the present invention, when the curved joined glass sheet manufactured by using the curved thin glass sheet including the transparent display unit is applied to a window for a vehicle, it is possible to provide a glass sheet for a vehicle that may output driving-related information required for a user. In addition, the curved joined glass sheet manufactured by using the curved thin glass sheet including the variable color layer may be applied to a sunroof window, a side window, or the like among the windows for a vehicle.

According to an exemplary embodiment of the present invention, a Vickers hardness ratio between the curved thick glass sheet and the curved thin glass sheet may be 1:1.1 to 1:1.3. Specifically, the Vickers hardness ratio between the curved thick glass sheet and the curved thin glass sheet may be 1:1.12 to 1:1.27, 1:1.15 to 1:1.25, or 1:1.2 to 1:1.23. The curved joined glass sheet including the curved thin glass sheet, which has higher hardness than the curved thick glass sheet, may be excellent in wear resistance, scratch resistance, and durability.

According to an exemplary embodiment of the present invention, the Vickers hardness of the curved thin glass sheet may be 5.5 GPa or more and 7 GPa or less. Specifically, the curved thin glass sheet may have the Vickers hardness of 5.8 GPa or more and 6.9 GPa or less, 6.0 GPa or more and 6.7 GPa or less, or 6.2 GPa or more and 6.5 GPa or less. The curved joined glass sheet including the curved thin glass sheet having the value of the Vickers hardness within the above-mentioned range may be excellent in impact resistance, wear resistance, and durability. In addition, it is possible to reduce manufacturing costs for the curved joined glass sheet. In addition, the curved thick glass sheet may have the Vickers hardness of 5.2 GPa or more and 5.8 GPa or less.

The Vickers hardness of the curved thin glass sheet and the Vickers hardness of the curved thick glass sheet may be calculated by pressing the glass sheet with a Vickers indenter and then measuring a size of a mark. Specifically, the Vickers hardness of the curved thin glass sheet and the Vickers hardness of the curved thick glass sheet may be measured based on ASTM C1327-08 standard under a condition in which a temperature is 24° C., humidity is 35 RH %, an indentation load is 200 gf, and an indentation maintenance time is 20 seconds.

According to an exemplary embodiment of the present invention, a fracture toughness ratio between the curved thick glass sheet and the curved thin glass sheet may be 1:1.3 to 1:1.5. Specifically, the fracture toughness ratio between the curved thick glass sheet and the curved thin glass sheet may be 1:1.35 to 1:1.49, 1:1.37 to 1:1.45, or 1:1.39 to 1:1.45. As the curved thin glass sheet has fracture toughness within the above-mentioned range with respect to the curved thick glass sheet, it is possible to improve fracture resistance of the curved joined glass sheet against external impact and to effectively prevent a deterioration in fracture strength of the curved joined glass sheet.

According to an exemplary embodiment of the present invention, a value of the fracture toughness of the curved thin glass sheet may be 1.0 MPa·m$^{1/2}$ or more and 1.3 MPa·m$^{1/2}$ or less. Specifically, the value of the fracture toughness of the curved thin glass sheet may be 1.1 MPa·m$^{1/2}$ or more and 1.25 MPa·m$^{1/2}$ or less, 1.15 MPa·m$^{1/2}$ or more and 1.25 MPa·m$^{1/2}$ or less, or 1.18 MPa·m$^{1/2}$ or more and 1.21 MPa·m$^{1/2}$ or less. The curved joined glass sheet including the curved thin glass sheet having the value of the fracture toughness within the above-mentioned range may be excellent in impact resistance.

According to the exemplary embodiment of the present invention, the value of the fracture toughness of the curved thick glass sheet may be 0.7 MPa·m$^{1/2}$ or more and 0.85 MPa·m$^{1/2}$ or less. Specifically, the value of the fracture toughness of the curved thick glass sheet may be 0.75 MPa·m$^{1/2}$ or more and 0.83 MPa·m$^{1/2}$ or less, or 0.77 MPa·m$^{1/2}$ or more and 0.8 MPa·m$^{1/2}$ or less.

The values of the fracture toughness of the curved thin glass sheet and the curved thick glass sheet may be measured by using an indentation fracture toughness measuring method which is a method that presses the glass sheet with a Vickers indenter until a crack is formed in the glass sheet, and then measures the value of the fracture toughness by using a length of the crack, a mark formed by the indenter, a load, and the like. Specifically, the values of the fracture toughness of the curved thin glass sheet and the curved thick glass sheet may be measured based on the KS L 1600:2010 standard under a condition in which a temperature is 24° C., humidity is 35 RH %, and an indentation load is 2 Kgf.

According to an exemplary embodiment of the present invention, an elastic modulus ratio between the curved thick glass sheet and the curved thin glass sheet may be 1:1.01 to 1:1.2. Specifically, the elastic modulus ratio between the curved thick glass sheet and the curved thin glass sheet may be 1:1.04 to 1:1.17, 1:1.06 to 1:1.15, 1:1.08 to 1:1.12, or 1:1.08 to 1:1.15. As the curved thin glass sheet has the elastic modulus within the above-mentioned range with respect to the curved thick glass sheet, the curved joined glass sheet may have a robust structure even though the curved joined glass sheet includes the curved thin glass sheet that is lighter in weight and smaller in thickness than the curved thick glass sheet.

According to an exemplary embodiment of the present invention, the elastic modulus of the curved thin glass sheet may be 70 GPa or more and 90 GPa or less. Specifically, the curved thin glass sheet may have the elastic modulus of 73 GPa or more and 87 GPa or less, 75 GPa or more and 85 GPa or less, 78 GPa or more and 80 GPa or less, 75 GPa or more and 80 GPa or less, or 80 GPa or more and 90 GPa or less. In addition, the curved thick glass sheet may have the elastic modulus of 65 GPa or more and 75 GPa or less.

The elastic modulus of the curved thin glass sheet and the elastic modulus of the curved thick glass sheet may be measured by a three-point bending test. Specifically, the elastic modulus of the curved thin glass sheet and the elastic modulus of the curved thick glass sheet may be measured through the three-point bending test using a universal testing machine (UTM) under a condition in which a temperature is 24° C. and humidity is 35 RH %. More specifically, it is possible to derive the elastic modulus based on a gradient calculated by setting a width of a sample to 20 mm, setting a support span to 50 mm, converting a displacement and a load measured by the UTM into strain and stress to derive a strain-stress (S-S) curve, and then linearly fitting the S-S curve.

Hereinafter, Examples will be described in detail to specifically describe the present invention. However, Examples according to the present invention may be modified in various different forms, and it is not interpreted that the scope of the present invention is limited to the following Examples. The Examples of the present specification are provided to further completely explain the present invention to those skilled in the art.

EXAMPLES

Example 1

Manufacture of Curved Thin Glass Sheet Having Functional Layer

A thin glass sheet, which was made of alkali-free glass, included $SiO_2$ of 61 wt. %, $Al_2O_3$ of 16 wt. %, MgO of 3 wt. %, CaO of 8 wt. % or less, and SrO of 0.05 wt. %, based on glass of 100 wt. %, and had a thickness of 0.5 mm, was prepared. The alkali-free glass had an elastic modulus of 78 GPa, Vickers hardness of 6.3 GPa, and fracture toughness of 1.20 $MPa·m^{1/2}$.

Thereafter, the thin glass sheet was heated at 900° C. for 60 seconds, and a curved thin glass sheet having a radius of curvature of about 3,000 mm was manufactured by using a self-weight technique. Thereafter, a concave surface of the curved thin glass sheet was positioned adjacent to a vacuum plate (LG Chem., Ltd.), and the vacuum plate was operated, such that the curved thin glass sheet was elastically deformed into a plate-shaped thin glass sheet. In this case, a value of stress was calculated by using Solidworks Simulation, a change in stress, which was generated on a surface of the plate-shaped thin glass sheet because of the elastic deformation, was about 0.8 GPa, and tensile stress present on the surface of the plate-shaped thin glass sheet was about 270 MPa.

Thereafter, the plate-shaped thin glass sheet sucked on the vacuum plate was coated with a conductive film capable of generating heat with a thickness of about 1 µm by using a spray pyrolysis method. Specifically, a seed layer was provided on one surface of the plate-shaped thin glass sheet, and the seed layer was coated with an FTO, which is an electrically conductive material, with a thickness of about 1 µm by using the spray pyrolysis method.

Thereafter, the curved thin glass sheet having a heat generating function was manufactured by stopping the operation of the vacuum plate.

Manufacture of Curved Joined Glass Sheet Having Functional Layer

A thick glass sheet, which was made of soda lime glass, included $SiO_2$ of 72 wt. %, $Al_2O_3$ of 0.15 wt. %, $Na_2O$ of 14 wt. %, $K_2O$ of 0.03 wt. %, CaO of 9 wt. %, and MgO of 4 wt. %, based on glass of 100 wt. %, and had a thickness of 2.0 mm, was prepared, and a polyvinyl butyral film having a thickness of 0.5 mm was prepared as a joining film. The soda lime glass had an elastic modulus of 72 GPa, Vickers hardness of 5.6 GPa, and fracture toughness of 0.85 $MPa·m^{1/2}$.

Thereafter, the thick glass sheet was heated at 600° C. for 60 seconds, and a curved thick glass sheet was manufactured by using a self-weight technique. A radius of curvature of the curvedly formed curved thick glass sheet was about 1,400 mm.

Thereafter, a joining film was attached to a functional layer provided on the curved thin glass sheet, and a concave surface of the curved thick glass sheet was positioned adjacent to the joining film. Thereafter, the joining film and the curved thick glass sheet were put into a vacuum bag, the vacuum bag was sealed, the vacuum bag was compressed with a vacuum ring at a temperature of about 20° C. and under a pressure of 150 torr, and the curved thick glass sheet and the curved thin glass sheet having the functional layer were joined together and treated in an autoclave at a temperature of about 130° C. under a pressure of 9,750 torr, such that a curved joined glass sheet having a heat generating function was manufactured. A radius of curvature of the manufactured curved joined glass sheet having a heat generating function was about 1,400 mm.

Example 2

Manufacture of Curved Thin Glass Sheet Having Functional Layer

An ion reinforcing thin glass sheet, which had the same thickness as the glass sheet in Example 1, was prepared, the thin glass sheet was heated at 750° C. for 55 seconds, and a curved thin glass sheet having a radius of curvature of about 1,300 mm was manufactured by using a self-weight technique. Thereafter, the curved thin glass sheet was subjected to an ion reinforcing treatment by immersing the curved thin glass sheet for about one and a half hours in a bath accommodating potassium nitrate ($KNO_3$) salt heated at about 400° C. Thereafter, with the same method as in Example 1, the curved thin glass sheet was elastically deformed into a plate-shaped thin glass sheet. In this case, a value of stress was calculated by using Solidworks Simulation, a change in stress, which was generated on a surface of the plate-shaped thin glass sheet because of the elastic deformation, was about 1.1 GPa, and tensile stress present on the surface of the plate-shaped thin glass sheet was about 355 MPa. Thereafter, with the same method as in Example 1, the curved thin glass sheet having a heat generating function was manufactured.

Manufacture of Curved Joined Glass Sheet Having Functional Layer

A thick glass sheet and a joining film, which were identical to those in Example 1, were prepared, the thick glass sheet was heated at 650° C. for 60 seconds, and a curved thick glass sheet was manufactured by using a self-weight technique. A radius of curvature of the curvedly formed curved thick glass sheet was about 1,200 mm.

Thereafter, with the same method as in Example 1, the curved joined glass sheet having a heat generating function was manufactured. A radius of curvature of the manufactured curved joined glass sheet having a heat generating function was about 1,200 mm.

Comparative Example 1

A thin glass sheet, which is identical to that in Example 2, was prepared, the thin glass sheet was heated at 900° C. for 110 seconds, and a curved thin glass sheet having a radius of curvature of about 1,000 mm was manufactured by using a self-weight technique. Thereafter, with the same method as in Example 2, the curved thin glass sheet was subjected to the ion reinforcing treatment. Thereafter, with the same method as in Example 1, the curved thin glass sheet was elastically deformed into a plate-shaped thin glass sheet. In this case, a change in stress, which was generated on a surface of the plate-shaped thin glass sheet because of the elastic deformation, was about 1.7 GPa, and tensile stress present on the surface of the plate-shaped thin glass sheet was about 900 MPa.

Comparative Example 2

Two glass sheets, which each were made of soda lime glass, included $SiO_2$ of 72 wt. %, $Al_2O_3$ of 0.15 wt. %, $Na_2O$ of 14 wt. %, $K_2O$ of 0.03 wt. %, CaO of 9 wt. %, and MgO of 4 wt. %, based on glass of 100 wt. %, and had a thickness of 2.1 mm, were prepared. The prepared soda lime glass had an elastic modulus of 72 GPa, Vickers hardness of 5.3 GPa, and fracture toughness of 0.85 $MPa \cdot m^{1/2}$. In addition, two polyvinyl butyral joining films having a thickness of 0.34 mm and a PET film on which a conductive metal mesh capable of generating heat was deposited were prepared. The PET film on which the conductive metal mesh was deposited was provided between the two joining films, such that a joined film having a heat generating function was manufactured.

Thereafter, the two soda lime glass sheets overlapped each other and then were curvedly processed by using a self-weight and by being heated at about 600° C. for 60 seconds. Thereafter, the joined film having a heat generating function was inserted between the two curvedly processed soda lime glass sheets and treated in an autoclave at a temperature of about 130° C. under a pressure of 9,750 torr, such that a curved joined glass sheet having a heat generating function was manufactured.

Comparative Example 3

Two soda lime glass sheets, which were identical to those in Comparative Example 2, were prepared, and a polyvinyl butyral film having a thickness of 0.76 mm was prepared as a joining film.

First, the two soda lime glass sheets overlapped each other and then were curvedly processed by using a self-weight technique and by being heated at about 600° C. for 60 seconds. Thereafter, with the same spray pyrolysis method as in Example 1, an FTO heat generating layer was formed on the other convex surface of the soda lime glass sheet.

Thereafter, the joining film was attached to the FTO heat generating layer, and the two soda lime glass sheets were joined. Thereafter, the two joined soda lime glass sheets were processed in an autoclave at a temperature of about 130° C. under a pressure of 9,750 torr, such that a functional curved joined glass sheet was manufactured.

Manufacturing Result

It was ascertained that in the case of Examples 1 and 2 in which the change in stress, which was generated on the surface of the plate-shaped thin glass sheet because of the elastic deformation, was 1.5 GPa or less and the tensile stress present on the surface of the plate-shaped thin glass sheet was 800 MPa or less, the elastically deformed plate-shaped thin glass sheet was not damaged. In contrast, it was ascertained that in the case of Comparative Example 1 in which the tensile stress present on the surface of the plate-shaped thin glass sheet after elastic deformation was higher than 800 MPa, a part of the thin glass sheet was damaged when the thin glass sheet was elastically deformed into a flat plate shape.

In addition, it was ascertained that the thickness of the functional layer provided on the curved thin glass sheet manufactured in Examples 1 and 2 was entirely uniform and the temperature of the generated heat was uniform for each position of the glass sheet. In addition, it was ascertained that there was no damage to the functional layer included in the curved joined glass sheet manufactured in Examples 1 and 2.

In addition, it was ascertained that in the case of Comparative Example 2, buckling occurred on the PET film having a heat generating function during the process of curvedly processing the two soda lime glass sheets, such that wrinkles and bubbles were formed in the manufactured curved joined glass sheet.

It was ascertained that in the case of Comparative Example 3, a thickness of the FTO heat generating layer formed on the other convex surface of the soda lime glass sheet was not uniform. In addition, it was ascertained that heat generating quality of the manufactured curved joined glass sheet was inferior.

Therefore, it can be seen that according to the exemplary embodiment of the present invention, it is possible to easily manufacture a curved thin glass sheet and a functional curved joined glass sheet which have a functional layer that has a uniform thickness and excellent quality.

DESCRIPTION OF MAIN REFERENCE NUMERALS OF DRAWINGS

10: Thin glass sheet
20: Functional layer
30: Joining film
40: Thick glass sheet

The invention claimed is:

1. A method of manufacturing a curved thin glass sheet having a functional layer, the method including:
    preparing a curved thin glass sheet;
    elastically deforming the curved thin glass sheet into a plate-shaped thin glass sheet by applying an external force to the curved thin glass sheet, wherein tensile stress present on the surface of the elastically deformed plate-shaped thin glass sheet is 800 MPa or less;
    providing a functional layer on one surface of the plate-shaped thin glass sheet with the external force maintained; and
    deforming the plate-shaped thin glass sheet into a curved thin glass sheet by removing the external force.

2. The method of claim 1, wherein the curved thin glass sheet is maintained in the form of a plate by using adhesive force or sucking a concave surface of the curved thin glass sheet in a vacuum.

3. The method of claim 1, wherein a change in stress, which is generated at a surface of the plate-shaped thin glass sheet because of the elastic deformation, is 1.5 GPa or less.

4. The method of claim 1, wherein the curved thin glass sheet has thickness of 0.3 mm or more and 1.0 mm or less.

5. The method of claim 1, wherein the functional layer is a transparent heat generating layer, a transparent display unit, or a variable color layer.

6. A curved thin glass sheet having a functional layer manufactured by the method according to claim 1.

7. A method of manufacturing a curved joined glass sheet having a functional layer, the method comprising:
    manufacturing a curved thin glass sheet having a functional layer by the method according to claim 1;
    providing a joining film or a bonding agent between the functional layer and a concave surface of a curved thick glass sheet whose thickness is larger than that of the curved thin glass sheet; and
    manufacturing a curved joined glass sheet by aligning and joining the curved thin glass sheet having the functional layer with the curved thick glass sheet.

8. The method of claim 7, further comprising:
heat-treating the curved joined glass sheet at a temperature of 80° C. or more and 140° C. or less.

9. The method of claim 7, wherein a thickness ratio between the curved thick glass sheet and the curved thin glass sheet is 1:0.1 to 1:0.6.

10. A curved joined glass sheet having a functional layer manufactured by the method according to claim 7.

* * * * *